(12) United States Patent
Liu

(10) Patent No.: US 11,001,286 B2
(45) Date of Patent: May 11, 2021

(54) TROLLEY ASSEMBLED BY SNAP-FIT STRUCTURE

(71) Applicant: GUANGDONG WIREKING HOUSEWARES AND HARDWARE CO., LTD., Foshan (CN)

(72) Inventor: Nengwen Liu, Foshan (CN)

(73) Assignee: GUANGDONG WIREKING HOUSEWARES AND HARDWARE CO., LTD., Foshan (CN)

( * ) Notice: Subject to any disclaimer, the term of this patent is extended or adjusted under 35 U.S.C. 154(b) by 0 days.

(21) Appl. No.: 16/702,568

(22) Filed: Dec. 4, 2019

(65) Prior Publication Data

US 2020/0231197 A1 Jul. 23, 2020

(30) Foreign Application Priority Data

Jan. 19, 2019 (CN) .......................... 201920093253.6

(51) Int. Cl.
*B62B 3/02* (2006.01)
*B62B 3/00* (2006.01)
*B62B 3/10* (2006.01)

(52) U.S. Cl.
CPC ................ *B62B 3/02* (2013.01); *B62B 3/005* (2013.01); *B62B 3/104* (2013.01)

(58) Field of Classification Search
CPC .................................. B32B 3/02; B32B 3/005
See application file for complete search history.

(56) References Cited

U.S. PATENT DOCUMENTS

| | | | | |
|---|---|---|---|---|
| 3,007,708 A | * | 11/1961 | Ochs ....................... | B62B 3/002 280/33.998 |
| 4,948,077 A | * | 8/1990 | Gonzalez ................ | B62B 3/002 248/129 |
| D703,412 S | * | 4/2014 | Snider ........................... | D34/21 |

* cited by examiner

*Primary Examiner* — James A Shriver, II
*Assistant Examiner* — James J Triggs

(57) ABSTRACT

A trolley assembled by a snap-fit structure is provided. The trolley comprises a first carrying basket, a second carrying basket, a third carrying basket each having a carrying space, and an assembly support frame arranged at both sides of the first, second and third carrying baskets. The carrying baskets are respectively provided with a snap-fit assembly component for assembling onto or disassembling from the assembly support frame. The assembly support frame is provided with a clamping groove which is matched with corresponding support crossbar for a snap-fit assembly or disassembly. The disclosed trolley has a simple structure but high structural stability and can be assembled arbitrarily in a snap-fit manner and disassembled into different components which then be receipted without tools. Moreover, the disclosed trolley is convenient for packaging, storage and transport, and has strong applicability and reduced usage cost.

10 Claims, 5 Drawing Sheets

TROLLEY ASSEMBLED BY SNAP-FIT STRUCTURE

TECHNICAL FIELD

The present disclosure relates generally to a technical field of a trolley, and more particularly, to a trolley assembled by a snap-fit structure.

BACKGROUND

The existing trolley generally includes a support frame and a tray with two or more layers arranged on the support frame in an integrated way. Such trolley is simple in structure and convenient for loading goods, so is widely used in various service industry places, such as families and restaurants.

However, in practical application, the trolley with the above structure has the following shortcomings.

1) The support frame and tray are fixed together to occupy a large volume, which is difficult to adapt to the application place with a small space, so the application scope is relatively small. At the same time, during the packaging and transport periods, due to occupying a large volume, the trolley is inconvenient to carry, and the cost of packaging and transport is high.
2) The traditional trolley generally has one or two integral support frames installed on the left and right sides of the tray. These support frames cannot be withdrawn, so that they occupy a large volume. In additional, they have a low compressive strength and are easy to be deformed, thus affecting the beauty and reducing the use effect of the product.

SUMMARY

The object of the present application is to provide a trolley assembled by a snap-fit structure, which has a simple structure but high structural stability and can be assembled arbitrarily in a snap-fit manner and disassembled into different components which then be receipted without tools, aiming at the shortcomings of the above existing technologies. Such trolley in the present application is convenient for packaging, storage and transport, and has strong applicability and reduced usage cost.

In one aspect, a trolley assembled by a snap-fit structure is provided, which comprising a first carrying basket, a second carrying basket, a third carrying basket each having a carrying space, and an assembly support frame arranged at both sides of the first carrying basket, the second carrying basket and the third carrying basket; wherein the assembly support frame is provided with a number of support crossbars distributed from top to bottom, wherein the first carrying basket, the second carrying basket and the third carrying basket are respectively provided with a snap-fit assembly component for assembling onto or disassembling from the assembly support frame; wherein the assembly support frame is provided with a clamping groove which is matched with corresponding support crossbar for a snap-fit assembly or disassembly.

In a preferable embodiment of the present application, the support crossbars are integrally formed on the assembly support frame from top to bottom, the snap-fit assembly component is arranged at both left sides and right sides of bottom surfaces of the first carrying basket, the second carrying basket and the third carrying basket, respectively; wherein the clamping groove of the snap-fit assembly component is matched and clamped with the corresponding support crossbar for assembling the first carrying basket, the second carrying basket and the third carrying basket on the assembly support frame successively from top to bottom in a snap-fit connection to form the trolley, or the clamping groove of the snap-fit assembly component is detached from the corresponding support crossbar for successively stacking the first carrying basket, the second carrying basket and the third carrying basket from top to bottom in a lower carrying space for forming a reception assembly bracket to receipt the assembly support frame.

In a preferable embodiment of the present application, the snap-fit assembly component comprises a fixed clamping block integrally formed on at both left sides and right sides of bottom surfaces of the first carrying basket, the second carrying basket and the third carrying basket, and an elastic clamping block assembled on the fixed clamping block in a snap-fit connection; wherein the clamping groove is arranged on the elastic clamping block.

In a preferable embodiment of the present application, the fixed clamping block is provided with a fastening hole at both sides, and the elastic clamping block is provided with an inverted fastening block at both sides for a snap-fit connection with the fastening hole.

In a preferable embodiment of the present application, the clamping groove comprises an arc clamping groove for adaptably clamping the support crossbars, and a clamping port enabling the support crossbars to enter the arc clamping groove, wherein the clamping port is arranged downwardly at the arc clamping groove.

In a preferable embodiment of the present application, the clamping port is provided with an inclined guide block at both sides respectively for facilitating the support crossbars to slide into the arc clamping groove, wherein the inclined guide block is arranged at both sides with a support connection block for supporting both sides of the fixed clamping block.

In a preferable embodiment of the present application, the assembly support frame is provided with a roller wheel at its bottom heads respectively, wherein the roller wheel is adapt to be assembled on the bottom head of the assembly support frame in a snap-fit connection or be dissembled from the assembly support frame and receipted in the carrying space of the first carrying basket.

In a preferable embodiment of the present application, the assembly support frame comprises an upper support frame integrally formed with one support crossbar, and a lower support frame integrally formed with two support crossbars arranged from the top, wherein the upper support frame is inserted into the lower support frame to form an arch assembly support.

In a preferable embodiment of the present application, the upper support frame is arranged with a mounting hole at its lower end head, while the lower support frame is arranged with an elastic positioning column for being assembled into the mounting hole in a stretchable snap-fit connection.

The trolley assembled by a snap-fit structure according to the present application has the following advantages.

a) Under the function of the clamping groove, the snap-fit assembly component is assembled and clamped on the support crossbar such that the first carrying basket, the second carrying basket and the third carrying basket are assembled on the assembly support frame successively from top to bottom in a snap-fit connection to form the trolley, which is flexible in assembly, stable in structure and convenient in use. Or under the function of the clamping groove, the snap-fit assembly component is detached from the corresponding support crossbar, which enables the first carrying basket, the second carrying basket and the third carrying basket to be detached from the assembly support frame, and then the detached first carrying basket, second carrying basket and third carrying basket are successively stacked in the lower carrying space from top to bottom. Meanwhile the detached assembly support frame can also be receipted in the carrying space of the first carrying basket. The disassembly is free of tool and can reduce the occupied volume. Meanwhile the disassembled components are convenient for packaging, storage and transport. Accordingly, the trolley assembled by a snap-fit structure according to the present application has strong applicability and low use cost.

2) Under the cooperation of the support crossbars, the first carrying basket, second carrying basket and third carrying basket are convenient to be assembled, and the structural stability of the assembly support is strengthened at the same time. In such a way, the use effect of the trolley can be ensured.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

Figure 1:
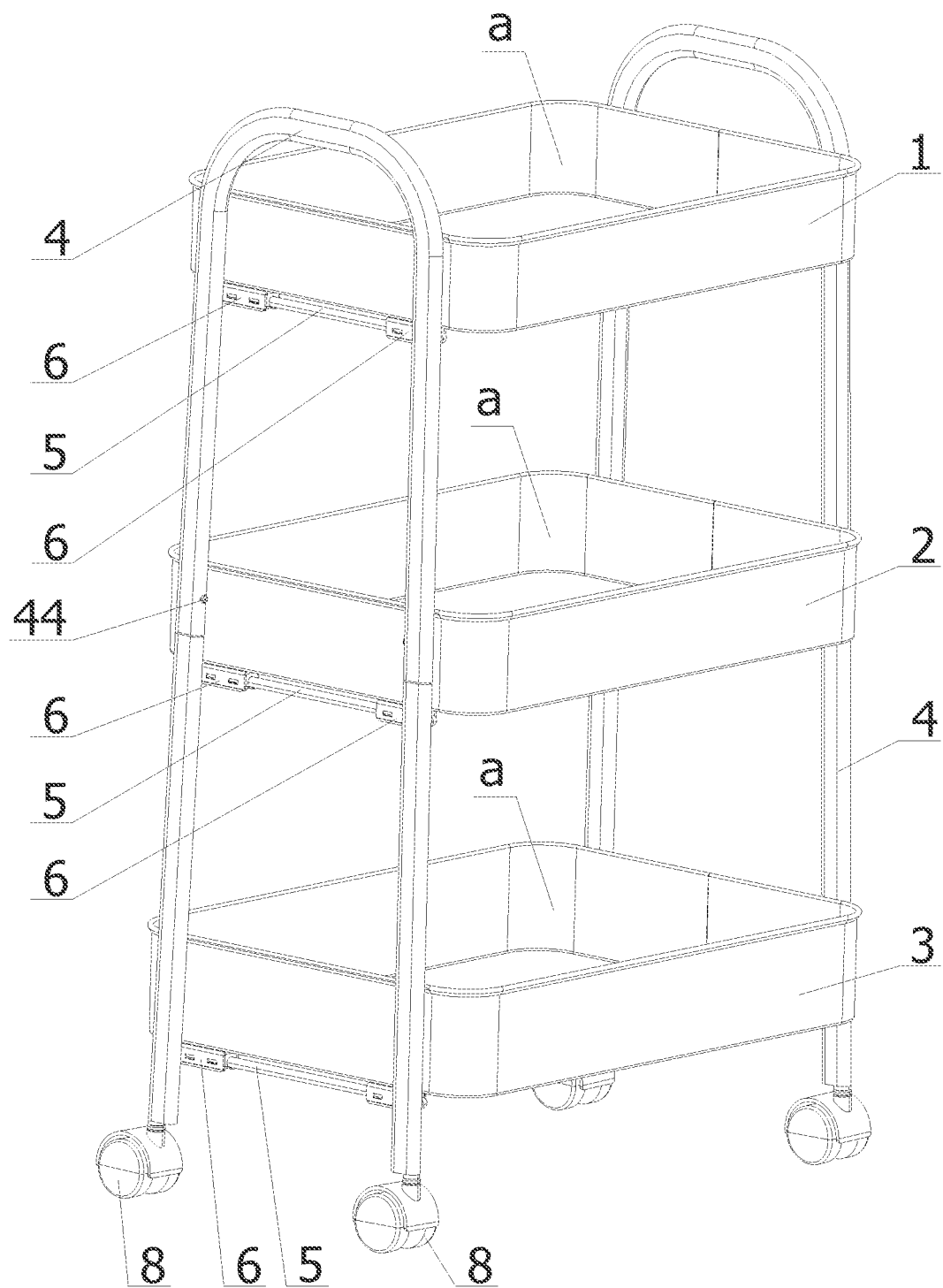
FIG. 1 is a schematic diagram showing the assembled status of the trolley according to a preferred embodiment of the present application.
Figure 2:
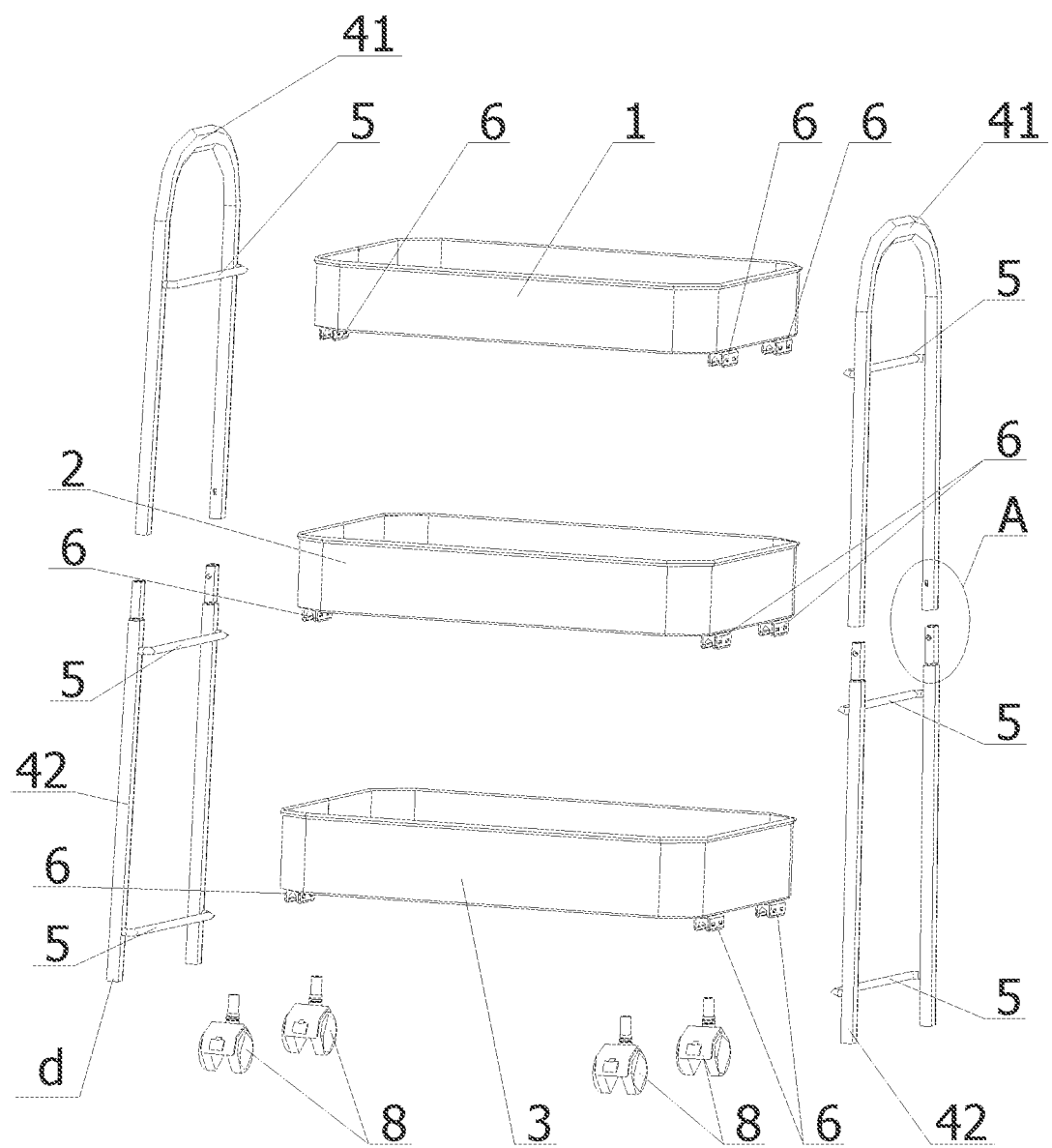
FIG. 2 is an exploded diagram of the trolley according to a preferred embodiment of the present application.
Figure 3:
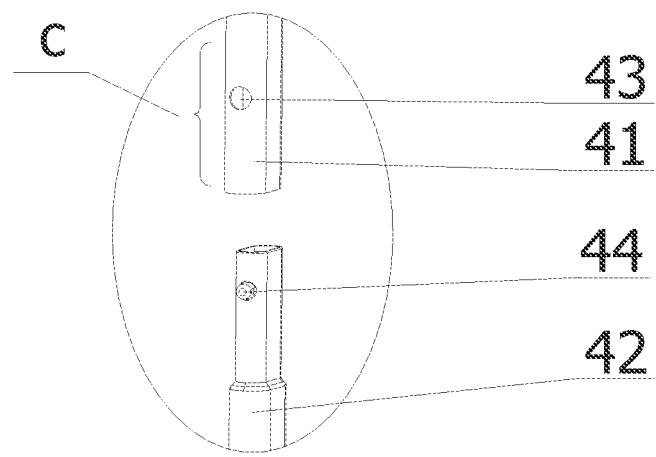
FIG. 3 is an enlarged diagram of A shown in FIG. 2.
Figure 4:
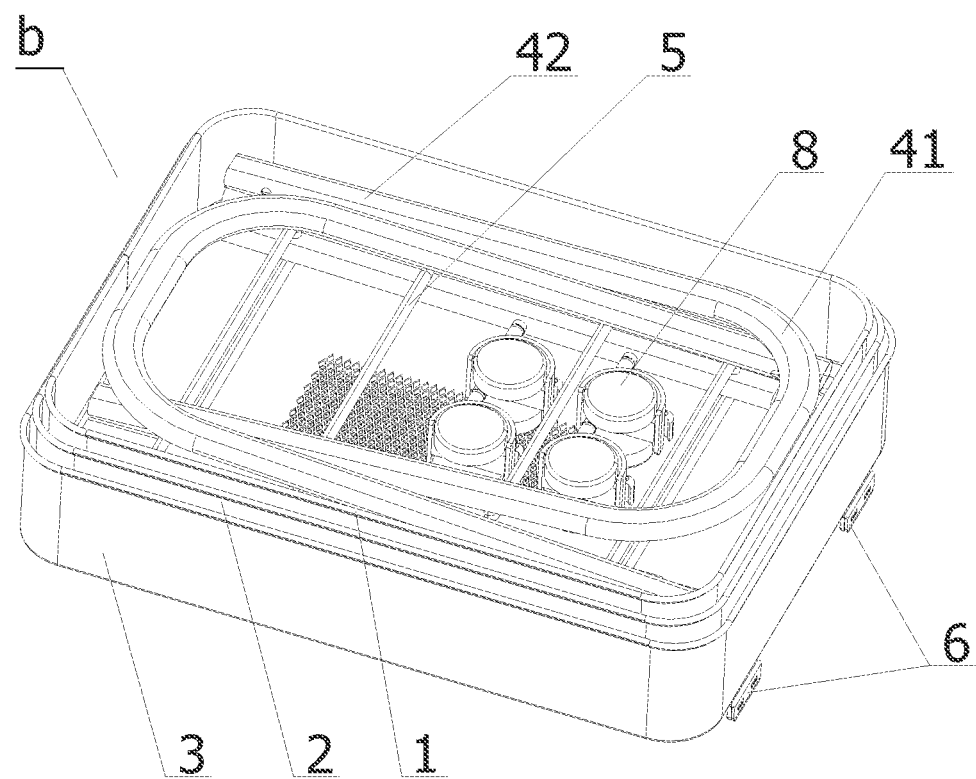
FIG. 4 is a structural diagram showing the reception status of the trolley according to a preferred embodiment of the present application.
Figure 5:
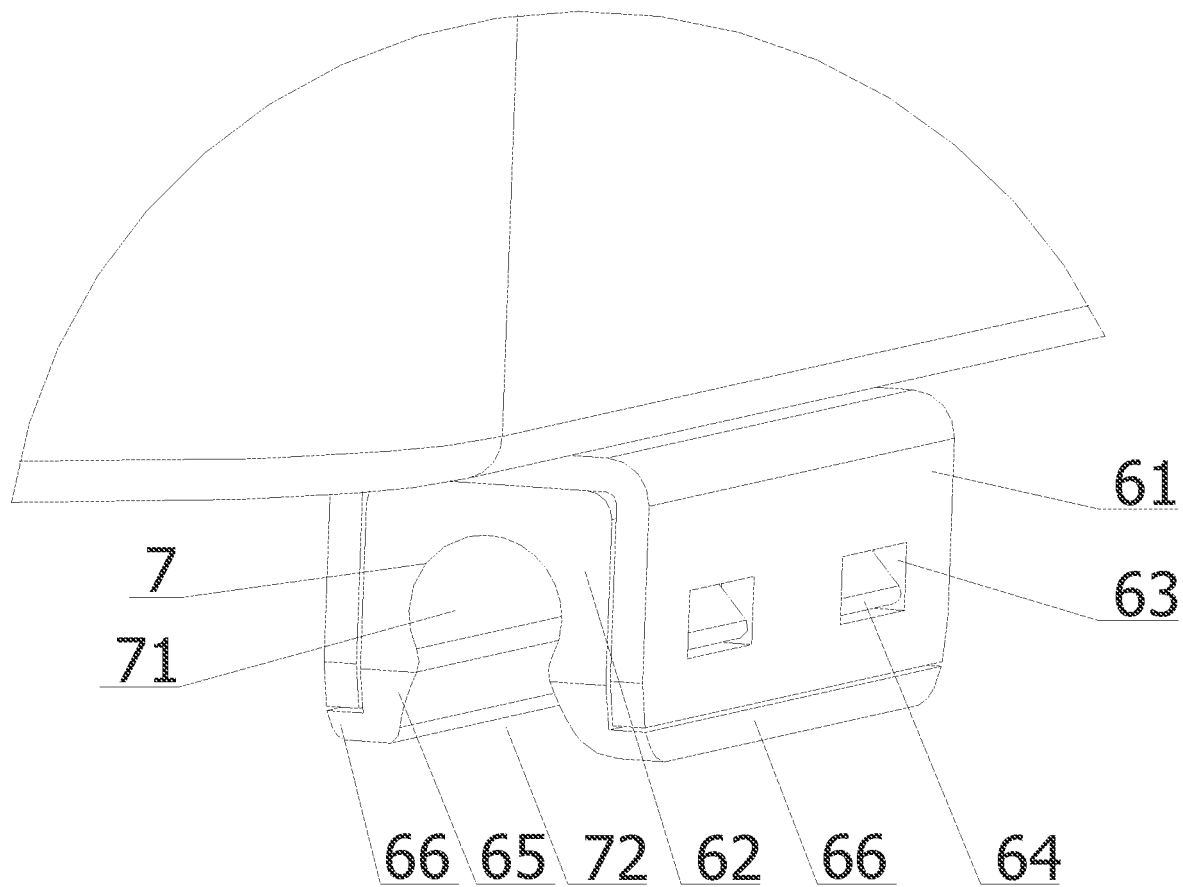
FIG. 5 is a diagram showing the installation and use of the snap-fit assembly component according to a preferred embodiment of the present application.
Figure 6:
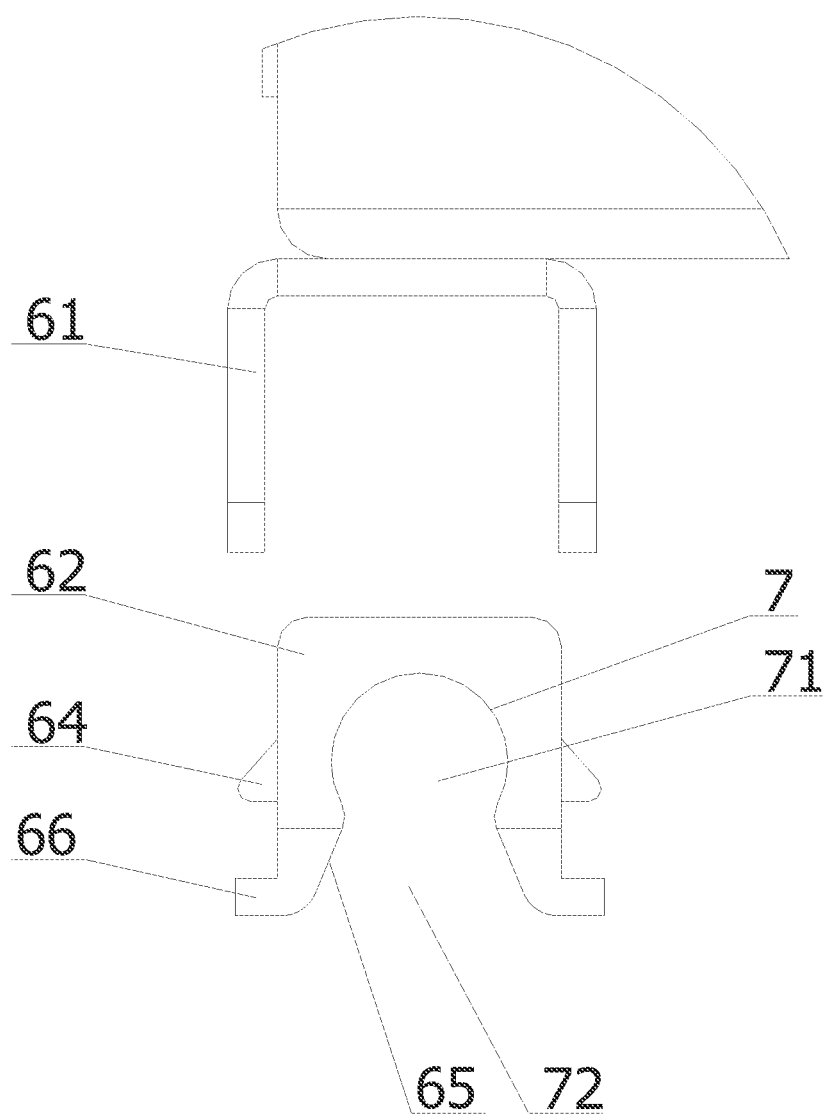
FIG. 6 is an exploded view of the snap-fit assembly component according to a preferred embodiment of the present application.

As shown in FIGS. 1-6, the trolley assembled by a snap-fit structure according to the present application comprises a first carrying basket 1, a second carrying basket 2, a third carrying basket 3 each having a carrying space a, and an assembly support frame 4 arranged at both sides of the first carrying basket 1, the second carrying basket 2 and the third carrying basket 3. The assembly support frame 4 is provided with a number of support crossbars 5 distributed from top to bottom. The first carrying basket 1, the second carrying basket 2 and the third carrying basket 3 are respectively provided with a snap-fit assembly component 6 for assembling onto or disassembling from the assembly support frame 4. The assembly support frame 4 is provided with a clamping groove 7 which is matched with corresponding support crossbar 5 for a snap-fit assembly or disassembly.

In the actual application, the support crossbars 5 are integrally formed on the assembly support frame 4 from top to bottom. The snap-fit assembly component 6 is arranged at both left sides and right sides of bottom surfaces of the first carrying basket 1, the second carrying basket 2 and the third carrying basket 3, respectively.

In the actual application, the first carrying basket 1, the second carrying basket 2 and the third carrying basket 3 may have different sizes or a same size. In a preferable embodiment of the present application, the first carrying basket 1 is a small carrying basket 1, the second carrying basket 2 is a moderate carrying basket and the third carrying basket 3 is a big carrying basket.

When the clamping groove 7 of the snap-fit assembly component 6 is matched and clamped with the corresponding support crossbar 5 for assembling the first carrying basket 1, the second carrying basket 2 and the third carrying basket 3 on the assembly support frame 4 successively from top to bottom in a snap-fit connection to form the trolley, the formed trolley is flexible in assembly, stable in structure and convenient in use.

When the clamping groove 7 of the snap-fit assembly component 6 is detached from the corresponding support crossbar 5 for stacking the first carrying basket 1, the second carrying basket 2 and the third carrying basket 3 successively from top to bottom in a lower carrying space a of the third carrying basket 3 for forming a reception assembly bracket b to receipt the assembly support frame 4, the disassembly is free of tool and can reduce the occupied volume. Meanwhile the disassembled components are convenient for packaging, storage and transport. Accordingly, the trolley assembled by a snap-fit structure according to the present application has strong applicability and low use cost.

Referring FIGS. 1-6, the snap-fit assembly component 6 comprises a fixed clamping block 61 integrally formed on at both left sides and right sides of bottom surfaces of the first carrying basket 1, the second carrying basket 2 and the third carrying basket 3, and an elastic clamping block 62 assembled on the fixed clamping block 61 in a snap-fit connection. The clamping groove 7 is arranged on the elastic clamping block 62.

In a preferable embodiment of the present application, the fixed clamping block 61 is provided with a fastening hole 63 at both sides, and the elastic clamping block 62 is provided with an inverted fastening block 64 at both sides for a snap-fit connection with the fastening hole 63.

In additional, the clamping groove 7 comprises an arc clamping groove 7 for adaptably clamping the support crossbars 5, and a clamping port 72 enabling the support crossbars 5 to enter the arc clamping groove 7, wherein the clamping port 72 is arranged downwardly at the arc clamping groove 7.

By applying a downward external pressure to the first carrying basket 1, the second carrying basket 2 and the third carrying basket 3, the elastic clamping block 62 can be deformed under the external pressure of the support crossbar 5, so that the support crossbar 5 can slide into the arc clamping groove 71 along the clamping port 72. Under the structural coordination of the elastic clamping block 62 and the fixed clamping block 61, the snap-fit assembly component 6 can be firmly clamped on the support crossbar 5.

During the disassembly, by applying an upward external pressure to the first carrying basket 1, the second carrying basket 2 and the third carrying basket 3, the elastic clamping block 62 can also be deformed, so that the support crossbar 5 can slide out of the clamping port 72 from the arc clamping groove 71. In such a way, the snap-fit assembly component 6 can be detached from the support crossbar 5.

In additional, the clamping port 72 is provided with an inclined guide block 65 at both sides respectively for facilitating the support crossbars 5 to slide into the are clamping groove 7. The inclined guide block 65 is arranged at both sides with a support connection block 66 for supporting both sides of the fixed clamping block 61. In such a way, the support crossbars 5 is facilitated to slide into or out from the arc clamping groove 7, thus the first carrying basket 1, the second carrying basket 2 and the third carrying basket 3 can be flexibly assembled onto or disassembled from the assembly support frame 4. The assembly and disassembly are free of tool. Furthermore, the trolley assembled by a snap-fit structure according to the present application is stable in structure and convenient in use. Moreover, the first carrying basket 1, the second carrying basket 2 and the third carrying basket 3 can be protected from being damaged during the assembly and disassembly, which may extend the service life of the product.

Referring FIGS. 1-6, the assembly support frame 4 comprises an upper support frame 41 integrally formed with one support crossbar 5, and a lower support frame 42 integrally formed with two support crossbars 5 arranged from the top. The upper support frame 41 is inserted into the lower support frame 42 to form an arch assembly support 4. In additional, the upper support frame 41 is arranged with a mounting hole 43 at its lower end head c, while the lower support frame 42 is arranged with an elastic positioning column 44 for being assembled into the mounting hole 43 in a stretchable snap-fit connection.

Under the structural coordination of the mounting hole 43 and the elastic positioning column 44, the upper support frame 41 and the lower support frame 42 can be assembled into the assembly support frame 4 for further being assembled with the first carrying basket 1, the second carrying basket 2 and the third carrying basket 3 in a snap-fit connection to form the trolley. Or under the structural coordination of the mounting hole 43 and the elastic positioning column 44, the upper support frame 41 and the lower support frame 42 can be detached from each other and then be receipted in the carrying space a of the first carrying basket 1, thus reducing the occupied volume and facilitating the package, storage and transportation.

Among them, under the cooperation of the support crossbars 5, the first carrying basket 1, the second carrying basket 2 and the third carrying basket 3 are convenient to be assembled, and the structural stability of the assembly support 4 is strengthened at the same time. In such a way, the use effect of the trolley can be ensured.

In a further preferable embodiment of the present application, the assembly support frame 4 is provided with a roller wheel 8 at its bottom heads respectively. The roller wheel 8 is adapt to be assembled on the bottom head d of the assembly support frame 4 in a snap-fit connection or be dissembled from the assembly support frame 4 and receipted in the carrying space a of the first carrying basket 1.

It is understandable that for one skilled in the art, the technical solution and concept of the present application can be changed or modified, and all such changes and modifications should fall within the protection scope of the present application.

What is claimed is:

1. A trolley assembled by a snap-fit structure comprising a first carrying basket, a second carrying basket, a third carrying basket each having a carrying space, and an assembly support frame arranged at both sides of the first carrying basket, the second carrying basket and the third carrying basket; wherein the assembly support frame is provided with a number of support crossbars distributed from top to bottom, wherein the first carrying basket, the second carrying basket and the third carrying basket are respectively provided with a snap-fit assembly component for assembling onto or disassembling from the assembly support frame; wherein the assembly support frame is provided with a clamping groove which is matched with corresponding support crossbar for a snap-fit assembly or disassembly; the snap-fit assembly component comprises a fixed clamping block integrally formed on at both left sides and right sides of bottom surfaces of the first carrying basket, the second carrying basket and the third carrying basket, and an elastic clamping block assembled on the fixed clamping block in a snap-fit connection; wherein the clamping groove is arranged on the elastic clamping block; the fixed clamping block is provided with a fastening hole at both sides, and the elastic clamping block is provided with an inverted fastening block at both sides for a snap-fit connection with the fastening hole.

2. The trolley assembled by a snap-fit structure according to claim 1, wherein the support crossbars are integrally formed on the assembly support frame from top to bottom, the snap-fit assembly component is arranged at both left sides and right sides of bottom surfaces of the first carrying basket, the second carrying basket and the third carrying basket, respectively; wherein the clamping groove of the snap-fit assembly component is matched and clamped with the corresponding support crossbar for assembling the first carrying basket, the second carrying basket and the third carrying basket on the assembly support frame successively from top to bottom in a snap-fit connection to form the trolley, or the clamping groove of the snap-fit assembly component is detached from the corresponding support crossbar for successively stacking the first carrying basket, the second carrying basket and the third carrying basket from top to bottom in a lower carrying space for forming a reception assembly bracket to receipt the assembly support frame.

3. The trolley assembled by a snap-fit structure according to claim 1, wherein the clamping groove comprises an arc clamping groove for adaptably clamping the support crossbars, and a clamping port enabling the support crossbars to enter the arc clamping groove, wherein the clamping port is arranged downwardly at the arc clamping groove.

4. The trolley assembled by a snap-fit structure according to claim 3, wherein the clamping port is provided with an inclined guide block at both sides respectively for facilitating the support crossbars to slide into the arc clamping groove, wherein the inclined guide block is arranged at both sides with a support connection block for supporting both sides of the fixed clamping block.

5. The trolley assembled by a snap-fit structure according to claim 1, wherein the assembly support frame is provided with a roller wheel at its bottom heads respectively, wherein the roller wheel is adapt to be assembled on the bottom head of the assembly support frame in a snap-fit connection or be dissembled from the assembly support frame and receipted in the carrying space of the first carrying basket.

6. The trolley assembled by a snap-fit structure according to claim 1, wherein the assembly support frame comprises an upper support frame integrally formed with one support crossbar, and a lower support frame integrally formed with two support crossbars arranged from the top, wherein the upper support frame is inserted into the lower support frame to form an arch assembly support.

7. The trolley assembled by a snap-fit structure according to claim 6, wherein the upper support frame is arranged with a mounting hole at its lower end head, while the lower support frame is arranged with an elastic positioning column for being assembled into the mounting hole in a stretchable snap-fit connection.

8. A trolley assembled by a snap-fit structure comprising a first carrying basket, a second carrying basket, a third carrying basket each having a carrying space, and an assembly support frame arranged at both sides of the first carrying basket, the second carrying basket and the third carrying basket; wherein the assembly support frame is provided with a number of support crossbars distributed from top to bottom, wherein the first carrying basket, the second carrying basket and the third carrying basket are respectively provided with a snap-fit assembly component for assembling onto or disassembling from the assembly support frame; wherein the assembly support frame is provided with a clamping groove which is matched with corresponding support crossbar for a snap-fit assembly or disassembly; wherein the support crossbars are integrally formed on the assembly support frame from top to bottom, the snap-fit assembly component is arranged at both left sides and right sides of bottom surfaces of the first carrying basket, the second carrying basket and the third carrying basket, respectively; wherein the clamping groove of the snap-fit assembly component is matched and clamped with the corresponding support crossbar for assembling the first carrying basket, the second carrying basket and the third carrying basket on the assembly support frame successively from top to bottom in a snap-fit connection to form the trolley, or the clamping groove of the snap-fit assembly component is detached from the corresponding support crossbar for successively stacking the first carrying basket, the second carrying basket and the third carrying basket from top to bottom in a lower carrying space for forming a reception assembly bracket to receipt the assembly support frame; wherein the snap-fit assembly component comprises a fixed clamping block integrally formed on at both left sides and right sides of bottom surfaces of the first carrying basket, the second carrying basket and the third carrying basket, and an elastic clamping block assembled on the fixed clamping block in a snap-fit connection; wherein the clamping groove is arranged on the elastic clamping block; wherein the fixed clamping block is provided with a fastening hole at both sides, and the elastic clamping block is provided with an inverted fastening block at both sides for a snap-fit connection with the fastening hole; wherein the clamping groove comprises an arc clamping groove for adaptably clamping the support crossbars, and a clamping port enabling the support crossbars to enter the arc clamping groove, wherein the clamping port is arranged downwardly at the arc clamping groove; the clamping port is provided with an inclined guide block at both sides respectively for facilitating the support crossbars to slide into the arc clamping groove, wherein the inclined guide block is arranged at both sides with a support connection block for supporting both sides of the fixed clamping block; wherein the assembly support frame comprises an upper support frame integrally formed with one support crossbar, and a lower support frame integrally formed with two support crossbars arranged from the top, wherein the upper support frame is inserted into the lower support frame to form an arch assembly support.

9. The trolley assembled by a snap-fit structure according to claim 8, wherein the assembly support frame is provided with a roller wheel at its bottom heads respectively, wherein the roller wheel is adapt to be assembled on the bottom head of the assembly support frame in a snap-fit connection or be dissembled from the assembly support frame and receipted in the carrying space of the first carrying basket.

10. The trolley assembled by a snap-fit structure according to claim 9, wherein the upper support frame is arranged with a mounting hole at its lower end head, while the lower support frame is arranged with an elastic positioning column for being assembled into the mounting hole in a stretchable snap-fit connection.

\* \* \* \* \*